United States Patent
Vanderelli et al.

(10) Patent No.: US 7,027,311 B2
(45) Date of Patent: Apr. 11, 2006

(54) METHOD AND APPARATUS FOR A WIRELESS POWER SUPPLY

(75) Inventors: Timm A. Vanderelli, Ligonier, PA (US); John G. Shearer, Ligonier, PA (US); John R. Shearer, Pittsburgh, PA (US)

(73) Assignee: FireFly Power Technologies, Inc., Ligonier, PA (US)

( * ) Notice: Subject to any disclaimer, the term of this patent is extended or adjusted under 35 U.S.C. 154(b) by 0 days.

(21) Appl. No.: 10/966,880

(22) Filed: Oct. 15, 2004

(65) Prior Publication Data

US 2005/0104453 A1 May 19, 2005

Related U.S. Application Data

(60) Provisional application No. 60/511,860, filed on Oct. 17, 2003.

(51) Int. Cl.
*H02M 5/00* (2006.01)
(52) U.S. Cl. .......................................................... 363/8
(58) Field of Classification Search ................ 363/8, 363/59, 60, 157, 164, 165
See application file for complete search history.

(56) References Cited

U.S. PATENT DOCUMENTS

| | | | | |
|---|---|---|---|---|
| 4,703,190 A | * | 10/1987 | Tamura et al. | 307/2 |
| 5,612,652 A | * | 3/1997 | Crosby | 333/24 R |
| 5,737,177 A | * | 4/1998 | Mett et al. | 361/234 |
| 5,898,911 A | * | 4/1999 | White | 455/232.1 |
| 6,094,161 A | * | 7/2000 | Cassen et al. | 342/175 |
| 6,633,750 B1 | * | 10/2003 | Dacus et al. | 455/126 |
| 6,841,981 B1 | * | 1/2005 | Smith et al. | 323/312 |

* cited by examiner

*Primary Examiner*—Matthew V. Nguyen
(74) *Attorney, Agent, or Firm*—Ansel M. Schwartz

(57) ABSTRACT

An apparatus for a wireless power supply including a mechanism for receiving a range of RF radiation across a collection of frequencies. The apparatus includes a mechanism for converting the RF radiation across the collection of frequencies, preferably at a same time into DC. A method for a wireless power supply including the steps of receiving a range of RF radiation across a collection of frequencies. There is the step of converting the RF radiation across the collection of frequencies, preferably at a same time into DC.

20 Claims, 2 Drawing Sheets

METHOD AND APPARATUS FOR A WIRELESS POWER SUPPLY

This application claims the benefit of Provisional Application No. 60/511,860, filed Oct. 17, 2003.

FIELD OF THE INVENTION

The present invention is related to the retrieval of radiated electrical energy. More specifically, the present invention is related to the retrieval of radiated electrical energy that is optimized for any given portion of the RF spectrum using a plurality of taps.

BACKGROUND OF THE INVENTION

In the operation of the invention, ambient RF and generated RF signals provide a source of potential energy that can be gathered, stored and supplied to a multitude of devices requiring electrical energy or that can restore energy lost by a discharged source.

Traditional RF receiving devices utilize an antenna to capture a narrow band of frequencies within the RF spectrum, whereby the collection of RF frequencies is then filtered, or tuned, to a specific frequency(s) for the purposes of maximizing the signal being transmitted within the chosen frequency(s). The potential energy contained in the signal is then used for its intended purpose, such as audio, video or data processing. These RF receiving devices have focused on maximizing selectivity of the frequency in order to isolate and to be coherent without interference from other sources.

SUMMARY OF THE INVENTION

The present invention pertains to an apparatus for a wireless power supply. The apparatus comprises means for receiving a range of RF radiation across a collection of frequencies The apparatus comprises means for converting the RF radiation across the collection of frequencies, preferably at a same time into DC.

The present invention pertains to a method for a wireless power supply. The method comprises the steps of receiving a range of RF radiation across a collection of frequencies. There is the step of converting the RF radiation across the collection of frequencies, preferably at a same time into DC.

BRIEF DESCRIPTION OF THE DRAWINGS

In the accompanying drawings, the preferred embodiment of the invention and preferred methods of practicing the invention are illustrated in which.

DETAILED DESCRIPTION

Figure 1:
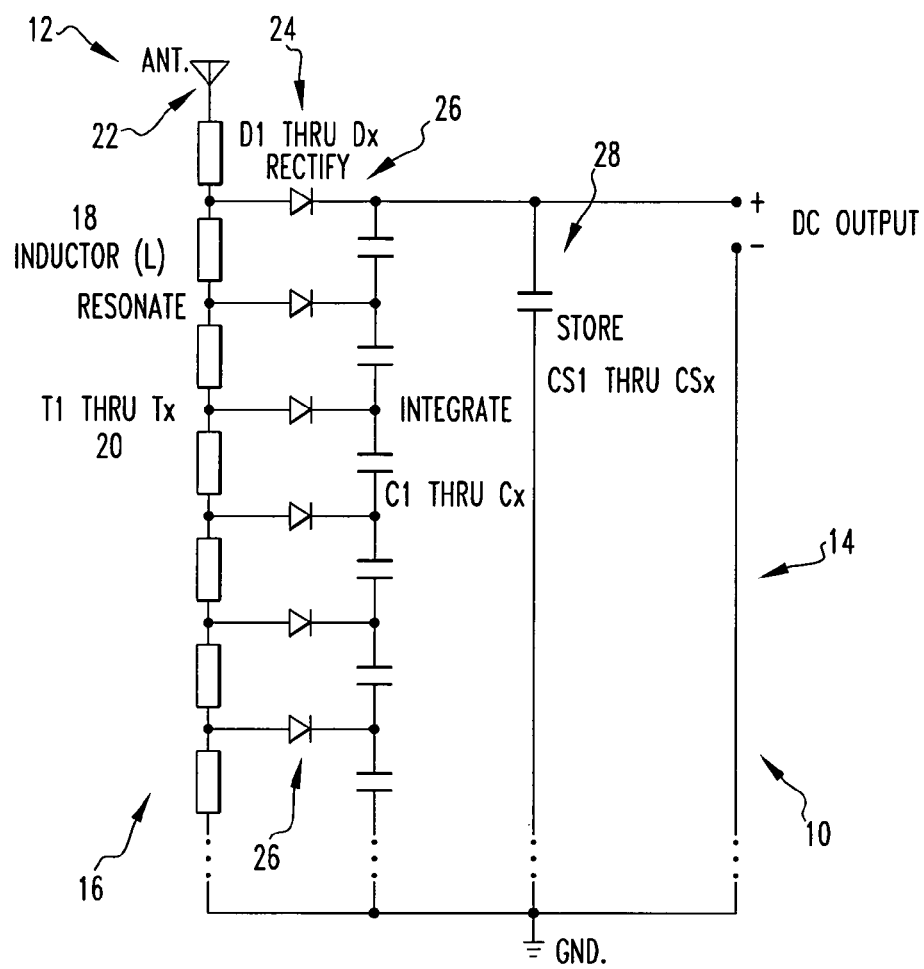
FIG. 1 is a schematic representation of a preferred embodiment of an apparatus of the present invention.

Referring now to the drawings wherein like reference numerals refer to similar or identical parts throughout the several views, and more specifically to FIG. 1 thereof, there is shown an apparatus 10 for a wireless power supply. The apparatus 10 comprises means 12 for receiving a range of RF radiation across a collection of frequencies. The apparatus 10 comprises means 14 for converting the RF radiation across the collection of frequencies, preferably at a same time into DC.

Preferably, the converting means 14 includes an absorbing mechanism 16 which is resonant for a desired band of RF spectrum. The absorbing mechanism 16 preferably includes an inductor 18 which is resonant for the desired band of RF spectrum. Preferably, the converting means 14 includes a plurality of taps 20 placed at points along the inductor 18 to access the RF energy.

The tap points preferably are calculated by matching the inductor's 18 impedance to the desired band of RF spectrum. Preferably, the receiving means 12 includes an antenna 22. The converting means 14 preferably includes a rectifying mechanism 24 which rectifies the RF energy and converts it into DC voltage. Preferably, the rectifying mechanism 24 includes a plurality of diodes 26 at each tap point which rectifies the RF energy and converts it into DC voltage.

The apparatus 10 preferably includes a storage device 28 for storing the DC voltage. Preferably, the antenna 22 impedance is matched 1:1 with the inductor 18 impedance. The RF spectrum preferably is between 60 Hz to 28 gigahertz.

The present invention pertains to a method for a wireless power supply. The method comprises the steps of receiving a range of RF radiation across a collection of frequencies. There is the step of converting the RF radiation across the collection of frequencies, preferably at a same time into DC.

Preferably, the converting step includes the step of absorbing the energy. The absorbing step preferably includes the step of absorbing the energy with an inductor 18. Preferably, the converting step includes the step of accessing the absorbing energy with a plurality of taps 20 on the inductor 18. There is preferably the step of matching the inductor's impedance to a desired RF range.

Preferably, the converting step includes the step of rectifying energy available at each tap and converting it into DC voltages. The rectifying step preferably includes the step of rectifying the energy available at each tap and converting it into DC voltages with diodes 26. Preferably, the converting step includes the step of summing the DC voltages. The summing step preferably includes the step of adding the DC voltages among a series capacitor integrator. Preferably, there is the step of storing the summed DC voltages. There is preferably the step of using the stored DC voltages.

A method and apparatus 10 for retrieval of radiated electrical energy is described herein. The radiated energy to be captured is being transmitted in the portion of the electromagnetic spectrum sometimes referred to as RF, or Radio Frequency. The primary purpose of the method and apparatus 10 described herein, is to receive RF energy and convert the energy into a usable form of power. The method and apparatus 10 does not discern or interpret individual signals or frequencies. It is designed to absorb and convert signal, carrier and any associated interference for a chosen band or range of frequencies into reusable power.

In contrast, to traditional RF receiving devices, this methodology and apparatus 10 avoids selectivity. It has the unique characteristic of accepting broad ranges of the RF spectrum as a collection of frequencies. Each collected range of frequencies is then rectified, or converted, as a whole into a single voltage. Preferably, at the same time of RF absorption, the resultant voltage is generated. The apparatus 10 makes no attempt to tune for any specific frequency or signal. Each voltage, which is gathered from a given range of frequencies, is then added together and made available to power a device directly, to be stored, or to supply energy to a recharging apparatus.

The radiated electrical energy, to be utilized by the circuit, can be in the form of a wide range of the RF spectrum. Some examples of ambient RF sources can include, but are not limited to: Very Low Frequency—VLF (Maritime/Aeronautical Mobile), Medium Frequency—MF (AM Radio Broadcast), High Frequency—HF (Shortwave Radio Broadcast), Very High Frequency—VHF (TV and FM Radio Broadcast), Ultra High Frequency—UHF (TV, HDTV, PCS, WiFi) and certain Microwave transmissions. In addition, the apparatus 10 allows for the reception of dedicated RF transmission that are generated and broadcast for the specific purpose of transmitting power to the apparatus 10 for absorption, collection and utilization. In this case, it is not necessary for the dedicated RF transmission to contain a specific signal or data that needs to be interpreted for ancillary purposes such as audio/video or data reception and interpretation.

Using the technique described herein, one can design and create an apparatus 10 that is optimized for any given portion of the RF Spectrum. The necessary electrical and magnetic characteristics of the apparatus 10 components will vary depending on the chosen portion of the spectrum. Because of this, it is impractical to create one single apparatus 10 to cover the entire RF spectrum. However, it is possible to create individual apparatus 10, each designed for a given RF band, and combine both the apparatus 10, their outputs for maximum power efficiency.

A portion of a selected RF frequency band is intercepted by an antenna 22 placed in the field of emitted energy. The antenna 22 receives energy, in accordance with its design efficiency, and directs it into a system where it is absorbed, rectified, summed and delivered for use or storage.

RF Energy→Antenna→
    [Absorbed→Rectified→Integrated→Delivered]
    →Used

RF signals striking an antenna 22 are fed into an inductor (L), which is resonant for the desired band of RF spectrum. Note: In areas with a high concentration of RF energy, there is no need to attach an antenna 22. The absorbed RF energy, consisting of fundamental, harmonic, inter-harmonic and standing waves is accessed via taps 20 (T1–Tx) on the inductor 18 which are placed at points along the inductor 18. A key characteristic of this device is that a capacitor-less front-end allows for the inductors' wide bandwidth and maximum admittance of the incoming RF energy. The tap points are calculated by matching the inductor 18 section's impedance to the desired RF range.

The resultant RF energy, available at each tap point, is rectified by a device, such as diodes 26 (D1–Dx), and converted into DC Voltages. The individual rectified voltages are spread among a series capacitor integrator consisting of capacitors (C1–Cx). This broadband approach allows maximum energy to be spread among the series capacitor stack.

The sum of the voltages available from C1–Cx is stored in any storage device 28 such as a capacitor or group of capacitors Cs (s1–sx) and made available for immediate use, or to supply electronic device(s) requiring intermittent power. The electrical characteristics of the storage devices or capacitors, the configuration and actual number of storage devices is dependent on the voltage and power requirements of the device the apparatus 10 is delivering power to. (See Figure One)

Although not considered part of the apparatus 10, the antenna 22 is an integral component of any practical device utilizing the method and apparatus 10 described. The key characteristics of the antenna 22 would be that it is capable of wide band reception, optimized for the chosen bandwidth, and takes into consideration the necessary effective area to support the power requirements of the target device.

Ideally, the antenna 22 impedance is matched 1:1 with the inductor 18 impedance of the apparatus 10.

Note: In areas with a high concentration of RF energy, there is no need to attach an antenna 22 to the apparatus 10.

Inductor 18:

The characteristics of the inductor 18 is dependent on the chosen bandwidth of frequencies to be collected and utilized. The ideal inductor 18 should be constructed so that the mid point of total inductance would be resonant at the center frequency of the chosen RF segment or spectrum.

Multiple taps 20 provide fundamental and inter-harmonic output voltages from the selected band segments of radio frequency energy.

Figure 2:
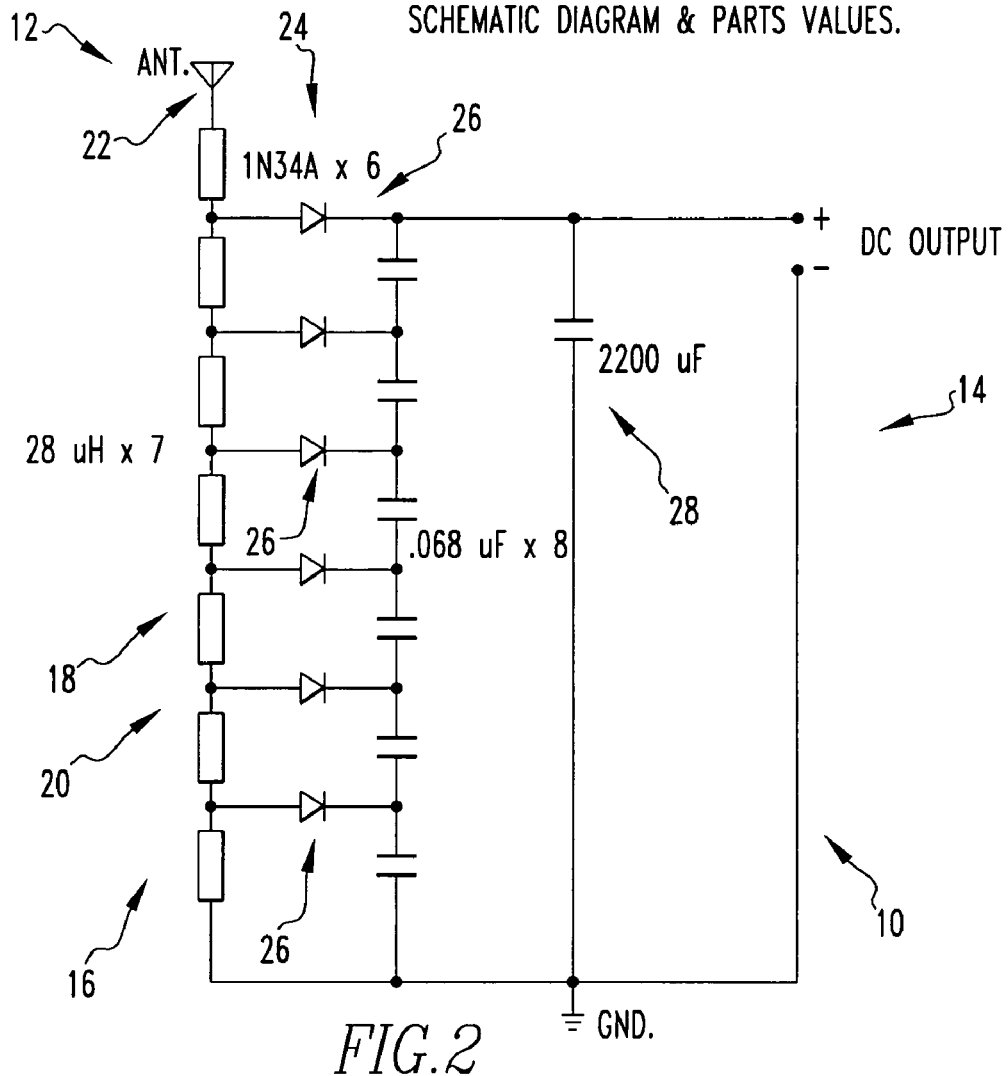
FIG. 2 is a schematic representation of a preferred embodiment of an apparatus of the present invention optimized for medium wave bandwidth RF energy retrieval, collection and storage.
Figure 3:
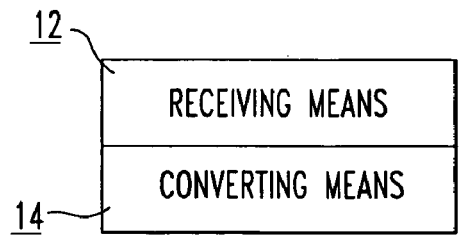
FIG. 3 is a block diagram of the apparatus of the present invention.

For example, a medium wave circuit (FIG. 2), utilizing an antenna 22 impedance of 375 ohms, into an inductive circuit with 375 ohms of reactance, with a center frequency of 1.2 MHz would require an inductance of 100 uH. The effective bandwidth would be approximately 2 MHz wide. (−3 db down at each end of the band).

The inductor 18 can be calculated using the following standard resonance formula (Formula 1):

$$L = (d \text{ squared times } n \text{ squared}) \text{ divided by } (18 \text{ times } d \text{ plus } 40 \text{ times } j)$$

Where
L=inductance in micro-henrys.
d=conductor diameter in inches.
j=conductor length in inches.
n=number of conductor iterations.

Using similar formulae, the required inductance can be re-calculated for henrys, milli-henrys, pico-henrys and nano-henrys. ie. VLF, LF, MW, HF, VHF, UHF and Microwave frequency band segments.

Utilizing a capacitor-less front-end insures the inductors' wide bandwidth, and maximum admittance to the incoming RF energy.

Taps 20:

Taps 20 are to be constructed and placed at points along the inductor 18. Each tap provides an individual output voltage into the rectifying portion of the apparatus 10.

The number of taps 20 from the inductor 18 can be calculated by the following formula (Formula 2):

$$Tn = Bw \times pi$$

Where
Tn=Total number of taps.
Bw=Effective Bandwidth of inductor (in Megahertz).
Pi=3.1416

The default position of each tap on the inductor 18 is equidistant along the inductor 18. Tap positions can also be calculated for optimum output voltage. When calculating the taps 20, one must take into consideration known frequencies within the chosen band segment that contain higher RF energies, And using a standard resonance inductance formula (1) each individual tap can be calculated for the required frequency and optimum voltage output.

Rectifiers:

The RF energy available at each tap is converted to DC voltage via a rectifying device. The type of rectifying device to be used is dependent on the chosen frequency band, and includes crystal, germanium, silicon and any other types.

Integrator:

A voltage integrator is composed of capacitors C1–Cx. The values of these capacitors are dependent on the chosen frequency band, the unique characteristics of the rectifiers and the load imposed by the Storage stage. The reactance of this circuit varies greatly, even during normal operation. However, one can use a standard formula for capacitive reactance as a starting point for preliminary calculations:

$$Xc = 1/(2 * pi * F * C)$$

Where
Xc=Capacitive reactance in ohms
C=Capacitance in Microfarads.
F=Frequency in Hertz.
Pi=3.1416

Storage:

Storage component(s) are determined by the power requirements of the attached device(s), and the available RF energy absorbed by the inductor (L).

Using a Medium Wave example, a 2,200 micro-farad electrolytic capacitor is used as storage.

Sample Apparatus 10: Medium Wave (AM) Wireless Power Supply

A device has been constructed, using the method stated above, which uses the ambient (existing) AM Broadcast band of the RF spectrum as its source of energy. The device's primary purpose is to optimize the energy absorbed, collected and converted to reusable power.

The size and characteristics of the antenna 22 required for the circuit to operate are not considered a design requirement for the apparatus 10. The antenna 22 needed to obtain sufficient energy to charge a storage device 28 in a typical urban area with several AM radio stations, would be similar to one used for a standard AM radio. In areas where there is a higher concentration of RF energy, the apparatus 10 itself, without an antenna 22, is sufficient to develop stored power.

The inductor 18 is in the form of an air coil comprised of enameled #28 gauge wire wound onto a 2" form. The coil is a continuous tightly wound wire with taps 20 placed every twenty turns with a total of six taps 20 available (T1–T6). The top of the coil is where the antenna 22 is connected. The bottom of the coil is connected to ground.

Germanium diodes (IN34A) (D1–D6) are connected to each tap on the coil. The series capacitor integrator (C1–C6) is constructed as illustrated with the C6 attached to ground. C1–C6 are poly capacitors with a 0.068 uF rating. The power storage device 28 utilized in this sample apparatus 10, C7, is a 2200 uF electrolytic capacitor.

Very wide band operation can be utilized by coupling multiple instances of the Broadband Wireless Power Supply together.

For Example:

A BWPS circuit designed and constructed (see design considerations) for a Very Low Frequency wave segment (60 Hz center frequency), can be coupled into another BWPS circuit designed and constructed (see design considerations) for an Ultra High Frequency wave segment (5 GHz center frequency). The outputs of each individual circuit connect (via another integrator circuit) into a common storage device 28 (i.e., capacitor) to "pool" collected and converted RF energy together. This technique can be repeated for any or all segments of the energy spectrum.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

What is claimed is:

1. An apparatus for a wireless power supply comprising:
   means for receiving a range of RF radiation across a collection of frequencies; and
   means for converting the RF radiation across the collection of frequencies into DC, the converting means includes an absorbing mechanism which is resonant for a desired band of RF spectrum.

2. An apparatus as described in claim 1 wherein the absorbing mechanism includes an inductor which is resonant for the desired band of RF spectrum.

3. An apparatus as described in claim 2 wherein the converting means includes a plurality of taps placed at points along the inductor to access the RF energy.

4. An apparatus as described in claim 3 wherein the tap points are calculated by matching the inductor's impedance to the desired band of RF spectrum.

5. An apparatus as described in claim 4 wherein the receiving means includes an antenna.

6. An apparatus as described in claim 5 wherein the converting means includes a rectifying mechanism which rectifies the RF energy and converts it into DC voltage.

7. An apparatus as described in claim 6 wherein the rectifying mechanism includes a plurality of diodes at each tap point which rectifies the RF energy and converts it into DC voltage.

8. An apparatus as described in claim 7 including a storage device for storing the DC voltage.

9. An apparatus as described in claim 8 wherein the antenna impedance is matched 1:1 with the inductor impedance.

10. An apparatus as described in claim 9 wherein the RF spectrum is between 60 Hz to 28 gigahertz.

11. A method for a wireless power supply comprising the steps of:
  receiving a range of RF radiation across a collection of frequencies; and
  converting the RF radiation across the collection of frequencies into DC, including the step of absorbing the energy.

12. A method as described in claim 11 wherein the absorbing step includes the step of absorbing the energy with an inductor.

13. A method as described in claim 12 wherein the converting step includes the step of accessing the absorbing energy with a plurality of taps on the inductor.

14. A method as described in claim 13 including the step of matching the inductor's impedance to a desired RF range.

15. A method as described in claim 14 wherein the converting step includes the step of rectifying energy available at each tap and converting it into DC voltages.

16. A method as described in claim 15 wherein the rectifying step includes the step of rectifying the energy available at each tap and converting it into DC voltages with diodes.

17. A method as described in claim 16 wherein the converting step includes the step of adding the DC voltages.

18. A method as described in claim 17 wherein the summing step includes the step of integrating the DC voltages among a series capacitor integrator.

19. A method as described in claim 18 including the step of storing the summed DC voltages.

20. A method as described in claim 19 including the step of using the stored DC voltages.

* * * * *